United States Patent
Fujimoto

(10) Patent No.: US 12,397,702 B2
(45) Date of Patent: Aug. 26, 2025

(54) VEHICLE HEADLIGHT CONTROL APPARATUS, VEHICLE HEADLIGHT CONTROL METHOD, AND VEHICLE HEADLIGHT SYSTEM

(71) Applicant: Stanley Electric Co., Ltd., Tokyo (JP)

(72) Inventor: Kazuhiro Fujimoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/724,641

(22) PCT Filed: Dec. 12, 2022

(86) PCT No.: PCT/JP2022/045692
§ 371 (c)(1),
(2) Date: Nov. 26, 2024

(87) PCT Pub. No.: WO2023/127473
PCT Pub. Date: Jul. 6, 2023

(65) Prior Publication Data
US 2025/0083589 A1    Mar. 13, 2025

(30) Foreign Application Priority Data
Dec. 28, 2021   (JP) ................................ 2021-213892

(51) Int. Cl.
*B60Q 1/115*    (2006.01)
(52) U.S. Cl.
CPC .................... *B60Q 1/115* (2013.01)
(58) Field of Classification Search
CPC ...................................... B60Q 1/115
See application file for complete search history.

(56) References Cited

U.S. PATENT DOCUMENTS

2023/0102156 A1*  3/2023  Yamasaki ............... B60Q 1/06
                                                        362/512

FOREIGN PATENT DOCUMENTS

| JP | 2001-191841 A | 7/2001 |
| JP | 2015-123865 A | 7/2015 |
| JP | 2018-095150 A | 6/2018 |
| JP | 2019-073189 A | 5/2019 |

OTHER PUBLICATIONS

International Search Report and Written Opinion mailed on Jan. 17, 2023, received for PCT Application PCT/JP2022/045692, filed on Dec. 12, 2022, 8 pages including English Translation.

* cited by examiner

Primary Examiner — Robert J May
(74) Attorney, Agent, or Firm — XSENSUS LLP

(57) ABSTRACT

To perform optical axis adjustment according to the state of a vehicle.

A vehicle headlight control apparatus which controls an optical axis of irradiation light emitted by a headlight of a vehicle including: a specification unit that specifies a vehicle state; and an optical axis adjustment unit that receives results from the specification unit and adjusts the optical axis; where the specification unit: sets a reference value which pertains to an acceleration to a first value when the vehicle is an engine vehicle; sets the reference value to a second value which is smaller than the first value when the vehicle is not an engine vehicle; then specifies the vehicle state to be a stopping state when the acceleration detected by an acceleration sensor is smaller than the reference value; and specifies the vehicle state to be a non-stopping state when the acceleration is greater than the reference value.

7 Claims, 8 Drawing Sheets

(A)

(B)

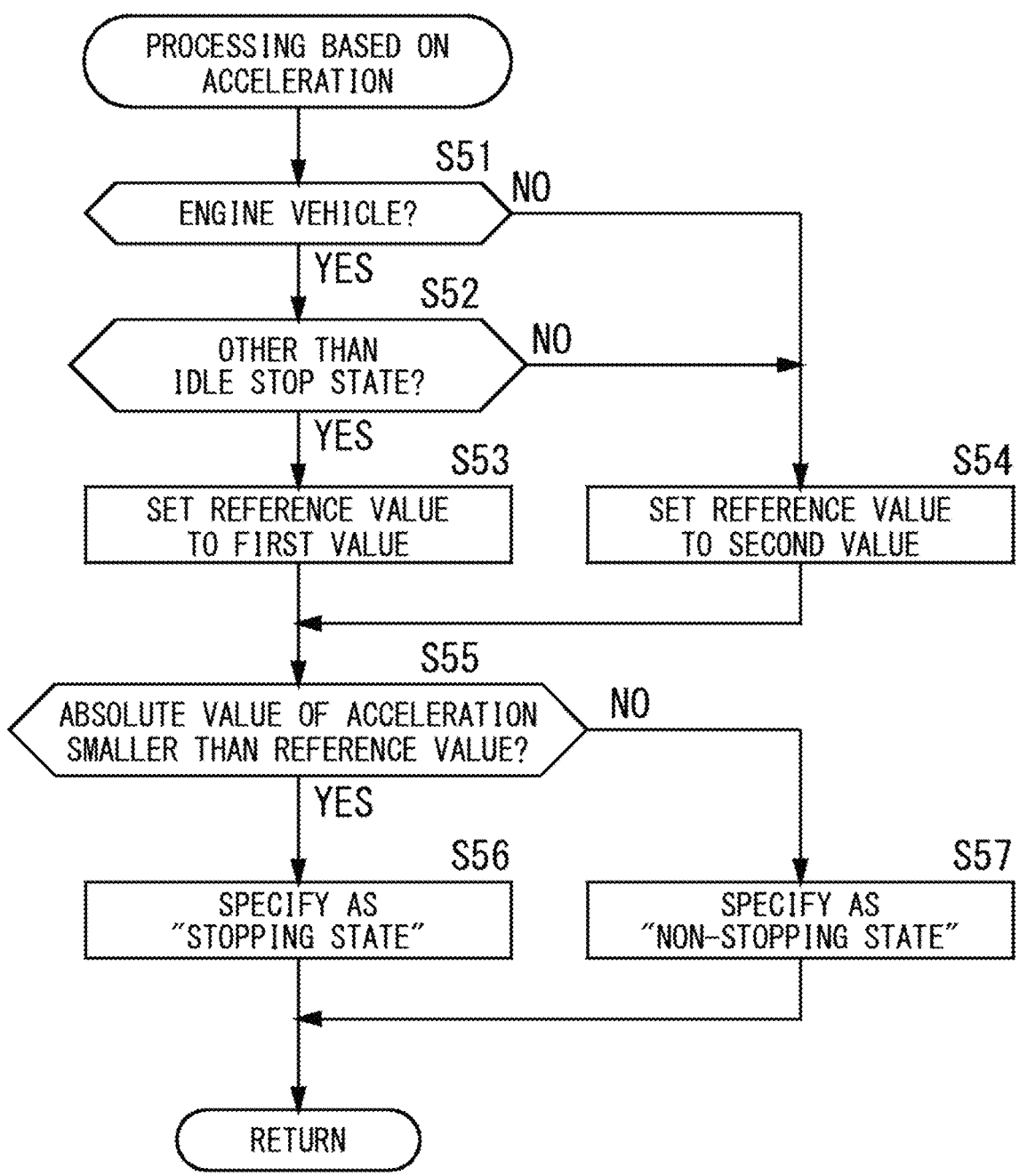

VEHICLE HEADLIGHT CONTROL APPARATUS, VEHICLE HEADLIGHT CONTROL METHOD, AND VEHICLE HEADLIGHT SYSTEM

CROSS-REFERENCE TO RELATED APPLICATIONS

The present application is based on PCT filing PCT/JP2022/045692, filed Dec. 12, 2022, which claims priority from Japanese Patent Application No. 2021-213892, filed Dec. 28, 2021, the entire contents of each are incorporated herein by reference.

TECHNICAL FIELD

The present disclosure relates to a technology for controlling a vehicle headlight.

BACKGROUND ART

Japanese Unexamined Patent Application Publication No. 2013-71477A (Patent Document 1) describes a control device for a vehicle lamp where, during stoppage of a vehicle, when a signal output from a cabin door open/close sensor or a signal output from a trunk door open/close sensor is received, the device performs control of generating and outputting an adjustment signal which instructs adjustment of an optical axis of the vehicle lamp using an output value from a tilt sensor, and during travel of the vehicle, the device performs control to avoid outputting the adjustment signal or performs control of generating and outputting a maintenance signal which instructs to maintain the position of the optical axis. In this control device, in order to determine whether the vehicle is "during stoppage" or "during travel", a detected value of a vehicle speed sensor is used.

Incidentally, in general, a vehicle speed sensor generates 10 or less pulse signals (for example, 2 to 8 pulse signals) per rotation of a vehicle axle. Therefore, when vehicle speed is extremely low (for example, 5 km/h or less), such as when a vehicle is creeping, it takes a certain amount of time from the time the vehicle starts to move until pulse signals are generated. During this time, there is a possibility that optical axis adjustment corresponding to "during stoppage" may be performed, and the optical axis may not be set appropriately.

PRIOR ART DOCUMENT

Patent Document

[Patent Document 1] Japanese Unexamined Patent Application Publication No. 2013-71477A

SUMMARY OF THE INVENTION

Technical Problem

In a specific aspect, it is an object of the present disclosure to perform optical axis adjustment according to the state of a vehicle.

Solution to the Problem (1) A vehicle headlight control apparatus according to one aspect of the present disclosure is (a) a vehicle headlight control apparatus which controls an optical axis of irradiation light emitted by a headlight of a vehicle including: (b) an acceleration sensor installed in the vehicle; (c) a specification unit which specifies whether a state of the vehicle is a stopping state or a non-stopping state; (d) an optical axis adjustment unit that adjusts the optical axis of the irradiation light in response to a specified result from the specification unit, by a control corresponding to each of the cases where the state of the vehicle is the stopping state and the non-stopping state; (e) where, as a first processing, the specification unit: sets a reference value which pertains to an acceleration to a first value when the vehicle is an engine vehicle; and sets the reference value to a second value which is smaller than the first value when the vehicle is other than the engine vehicle; then performs processing, to specify that the state of the vehicle is the stopping state when the absolute value of an acceleration detected using the acceleration sensor is smaller than the reference value, and to specify that the state of the vehicle is the non-stopping state when the absolute value of the acceleration is equal to or greater than the reference value.

(2) A vehicle headlight control method according to one aspect of the present disclosure is a vehicle headlight control method which controls an optical axis of irradiation light emitted by a headlight of a vehicle including: (a) to specify whether a state of the vehicle is a stopping state or a non-stopping state; (b) to adjust the optical axis of the irradiation light in response to a specified result from said (a), by a control corresponding to each of the cases where the vehicle is the stopping state and the non-stopping state, where, as a first processing, said (a): sets a reference value which pertains to an acceleration to a first value when the vehicle is an engine vehicle; and sets the reference value to a second value that is smaller than the first value when the vehicle is other than the engine vehicle; then performs processing, to specify that the state of the vehicle is the stopping state when the absolute value of an acceleration detected using an acceleration sensor is smaller than the reference value, and to specify that the state of the vehicle is the non-stopping state when the absolute value of the acceleration is equal to or greater than the reference value.

(3) A vehicle headlight system according to one aspect of the present disclosure is a vehicle headlight system that includes the control apparatus according to the above-described (1) and a headlight whose optical axis is controlled by the control apparatus.

According to the above configurations, optical axis adjustment is performed according to the state of the vehicle.

BRIEF DESCRIPTION OF THE DRAWINGS

FIG. 9 is a flowchart showing a detailed operation procedure of step S15 shown in FIG. 6.

MODE FOR CARRYING OUT THE INVENTION

Figure 1:
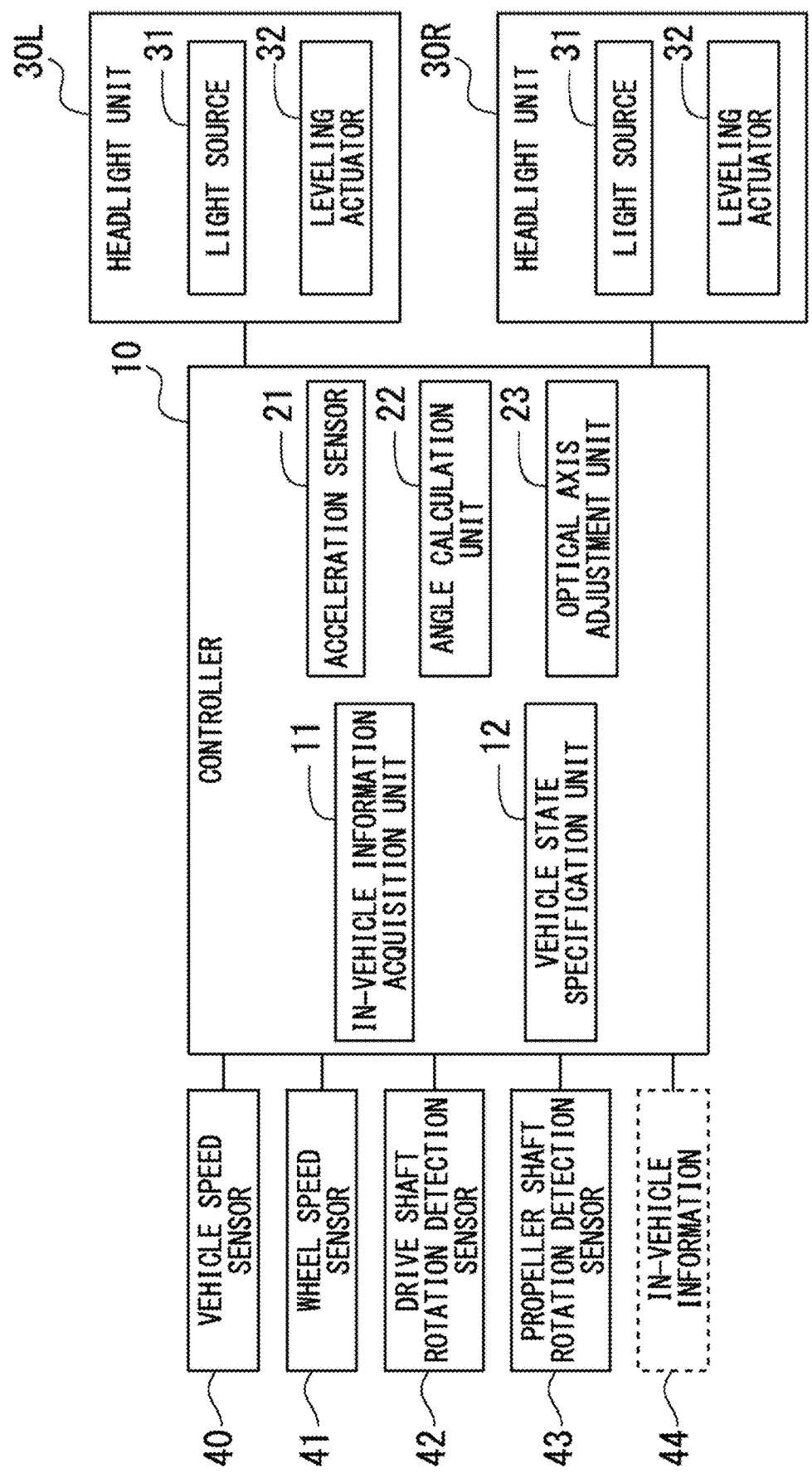
FIG. 1 is a block diagram showing a configuration of a vehicle headlight system according to one embodiment.

FIG. 1 is a block diagram showing a configuration of a vehicle headlight system according to one embodiment. The illustrated vehicle headlight system is configured to include a controller 10, a pair of headlight units 30L and 30R, a vehicle speed sensor 40, a wheel speed sensor 41, a drive shaft rotation detection sensor 42, and a propeller shaft rotation detection sensor 43.

The controller 10 is for controlling the turning on and off and controlling the optical axis (leveling) of the headlight units 30L and 30R. This controller 10 is realized by using a computer system having a CPU (Central Processing Unit), ROM (Read Only Memory), RAM (Random Access Memory) or the like, and by executing a predetermined operating program in this computer system, for example. The controller 10 of the present embodiment includes: an in-vehicle information acquisition unit 11; a vehicle state specification unit (a specification unit) 12; an angle calculation unit 22; and an optical axis adjustment unit 23; as functional blocks realized by the operating program executed by the CPU. Further, the controller 10 of the present embodiment includes an acceleration sensor 21.

The headlight units 30L and 30R are installed at predetermined positions on the left and right sides of the front of the vehicle to emit light to the front of the vehicle. Each of the headlight units 30L and 30R of the present embodiment is configured to include a light source 31 and a leveling actuator 32. These headlight units 30L and 30R are connected to the controller 10, and by turn on/off operation control of the light source 31 and operation control of the leveling actuator 32 by the controller 10, the optical axis of the emitted light of the light source 31 is adjusted.

The vehicle speed sensor 40 is for generating a pulse signal (vehicle speed pulse) that is an intermittent signal in accordance with the number of rotation of the vehicle axle (the shaft to which the wheels are attached) of the vehicle, and is connected to the controller 10. The vehicle speed sensor 40 generates several pulse signals per revolution of the vehicle axle, for example. Therefore, for example, when the vehicle is moving at a very low speed of 5 km/h or less due to a creep phenomenon or the like, it requires a relatively long time for the pulse signal to be generated from the vehicle speed sensor 40.

The wheel speed sensor 41 detects the wheel speed which is the rotation speed of the wheel attached to vehicle axle of the vehicle, and is connected to the controller 10. The wheel speed sensor 41 of the present embodiment may be a sensor that indirectly detects the rotation speed of the wheel by detecting the rotation speed of a portion that rotates with the wheel, such as an axle hub, a brake drum, or a drive shaft, or may be a sensor that directly detects the rotation speed from the wheel.

The drive shaft rotation detection sensor 42 detects the rotation speed of a drive shaft of the vehicle, and is connected to the controller 10. The drive shaft here is used to transfer driving force generated by a power source such as an engine or a motor to the wheels of the vehicle. Here, if the wheel speed sensor 41 described above detects the wheel speed based on the rotation speed of the drive shaft, the drive shaft rotation detection sensor 42 may be omitted.

The propeller shaft rotation detection sensor 43 detects the rotation speed of a propeller shaft of the vehicle, and is connected to the controller 10. The propeller shaft referred to here is a shaft that transfers driving force generated by a power source such as an engine or motor located at the front of the vehicle to a differential gear or the like located at the rear of the vehicle in a four-wheel drive vehicle or a rear-wheel drive vehicle, for example. Here, if a vehicle is not equipped with a propeller shaft, this propeller shaft rotation detection sensor 43 is omitted.

The in-vehicle information acquisition unit 11 of the controller 10 connects to a communication network (not shown) provided in the vehicle to perform data communication between a plurality of in-vehicle devices installed in the vehicle, and acquires various in-vehicle information (in-vehicle information data) 44 that can be transmitted and received over this communication network. The in-vehicle information 44 is configured to be appropriately obtainable from the plurality of in-vehicle devices installed in the vehicle. For example, various information regarding the vehicle (car name, model or the like) can be acquired from an electronic control system that controls the operation of the vehicle. A specific example of the in-vehicle information used in the present embodiment will be described later.

The vehicle state specification unit 12 of the controller 10 uses a pulse signal obtained from the vehicle speed sensor 40 and a wheel speed signal obtained from the wheel speed sensor 41 in order to specify whether the state of the vehicle is a "stopping state" or a "non-stopping state". A concrete specification method will be described later.

The acceleration sensor 21 of the controller 10 detects acceleration in each of three axes that are orthogonal to each other, for example, and is arranged within the vehicle so that each of the three axes corresponds to the longitudinal, lateral, and vertical directions of the vehicle. However, this arrangement is not limited thereto. Here, note that in the present embodiment, the acceleration sensor 21 is built inside the controller 10, but the acceleration sensor 21 need not be built inside the controller 10 and may be externally attached.

The angle calculation unit 22 of the controller 10 calculates attitude angle of the vehicle by using acceleration detected by the acceleration sensor 21. The attitude angle of the vehicle is the angle between the longitudinal axis of the vehicle and the road surface (reference axis). In accordance with the change in this attitude angle, the optical axis of the irradiation light emitted by the headlight unit 30 is adjusted by the optical axis adjustment unit 23.

The angle calculation unit 22 of the present embodiment calculates the attitude angle of the vehicle when the state of the vehicle is a stopping state, but does not calculate the attitude angle when the state of the vehicle is a non-stopping state. Various known methods can be used to calculate the attitude angle of the vehicle while in the stopping state, and there is no particular limitation. To give one simple example, when acceleration corresponding to the longitudinal direction of the vehicle obtained using the acceleration sensor 21 is defined as "Xa" and acceleration corresponding to the vertical direction of the vehicle is defined as "Ya", the attitude angle $\theta$ of the vehicle can be calculated as $\theta = \arctan(Xa/Ya)$. Here, the attitude angle may also be calculated when the state of the vehicle is a non-stopping state. Even in such a case, various known methods can be used for its calculation method, and there is no particular limitation.

The optical axis adjustment unit 23 of the controller 10 adjusts the optical axis of the irradiation light emitted by the headlight units 30L and 30R based on the attitude angle of the vehicle determined by the angle calculation unit 22.

Specifically, the optical axis adjustment unit 23 generates a control signal for operating the leveling actuators 32 of the headlight units 30L and 30R.

Each light source 31 of the headlight units 30L and 30R receives power from a power source (not shown) and generates light. The light source 31 may be anything that can generate light, such as a halogen lamp, a high-pressure mercury lamp, a metal halide lamp, a high-pressure sodium lamp, or a semiconductor light-emitting element such as an LED.

Each leveling actuator 32 of the headlight units 30L and 30R variably sets the direction of the light source 31 based on the control signal supplied from the optical axis adjustment unit 23 in order to adjust the angle of the optical axis, which is the main direction in which light from the light source 31 travels.

Figure 2:
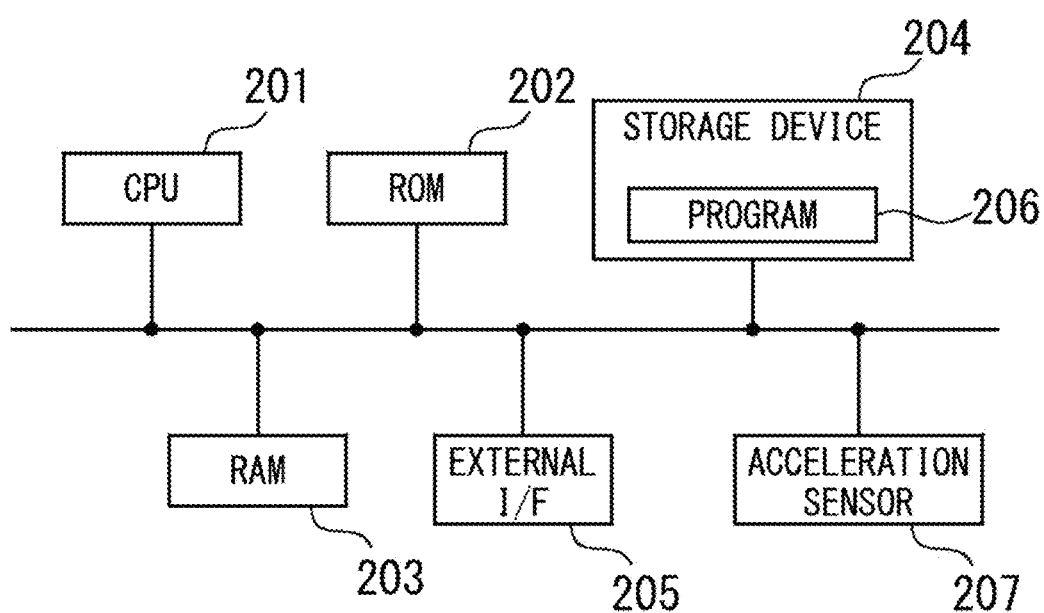
FIG. 2 is a diagram showing a configuration example of a computer system that realizes a vehicle control ECU.

FIG. 2 is a diagram showing a configuration example of a computer system that realizes a vehicle control ECU. The illustrated computer system is configured to include a CPU 201, a ROM 202, a RAM 203, a storage device 204, an external interface (I/F) 205, and an acceleration sensor 207 that are communicably connected to each other. The CPU 201 operates based on a basic control program read from the ROM 202, reads a program (application program) 206 stored in the storage device 204, and executes the program. As a result, functions such as the above-described in-vehicle information acquisition unit 11, vehicle state specification unit 12, angle calculation unit 22, optical axis adjustment unit 23 are realized. The RAM 203 temporarily stores data which is used when the CPU 201 operates. The storage device 204 is a non-volatile data storage device such as a hard disk drive or a SSD (Solid State Drive), and stores various data such as the program 206. The external interface 205 is an interface that connects the CPU 201 and external devices. In the present embodiment, the external interface is used to connect the vehicle speed sensor 40, the wheel speed sensor 41 or the like to the CPU 201. The acceleration sensor 207 corresponds to the above-described acceleration sensor 21.

Figure 3:
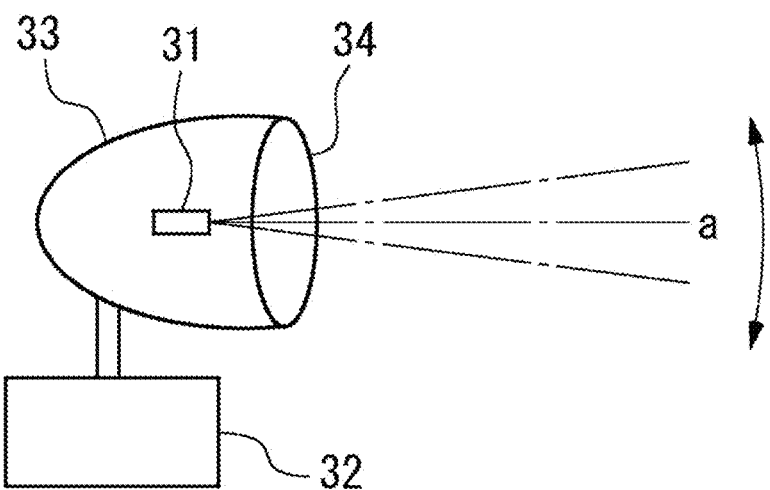
FIG. 3 is a diagram schematically showing a configuration and operation of a headlight unit.

FIG. 3 is a diagram schematically showing a configuration and operation of a headlight unit. The headlight units 30L and 30R of the present embodiment each includes the above-described light source 31, a housing 33 that stores the light source 31, and a lens 34 which is provided in front of the light source 31 (in the direction in which light is emitted) and is fixed to the housing 33. The inner surface of the housing 33 is provided with a reflective surface that reflects light from the light source 31 forward. The leveling actuator 32 is connected to the housing 33 that stores the light source 31, and changes the attitude of the housing 33. Thereby, optical axis "a" of the light from the light source 31 can be variably set. For example, when the rear part of the vehicle is relatively lowered, the optical axis "a" is controlled to be directed downward, and when the front part of the vehicle is relatively lowered, the optical axis "a" is controlled to be directed upward. The degree of how much the optical axis should be directed downward or upward at that time is set in accordance with the attitude angle of the vehicle. The optical axis "a" can also be referred to as the direction of irradiation light.

Figure 4:
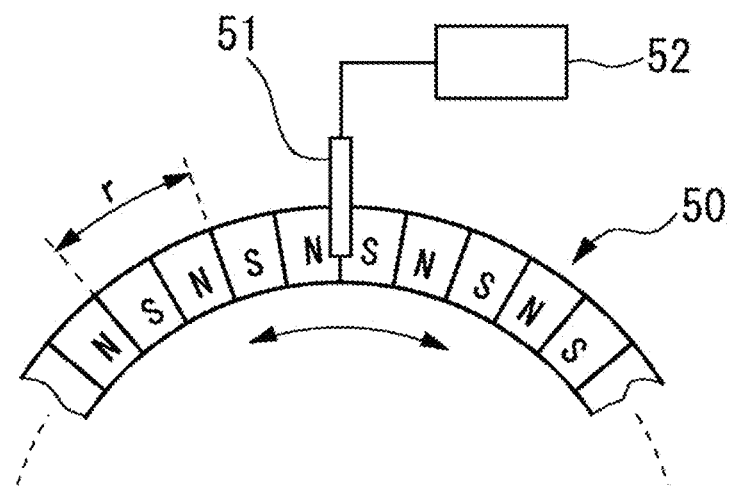
FIG. 4 is a diagram schematically showing a configuration example of a wheel speed sensor.

FIG. 4 is a diagram schematically showing a configuration example of a wheel speed sensor. The wheel speed sensor 41 of the present embodiment is configured to include a magnetic sensor rotor 50, a Hall element (detection element) 51, and a signal processing circuit 52. The magnetic sensor rotor 50 is made using magnetized rubber, for example, and has N poles and S poles arranged alternately along the circumferential direction. This magnetic sensor rotor 50 is provided on a portion that rotates (a rotating body) in conjunction with the rotation of the wheel, such as the axle hub described above. The smaller the installation range "r" of a pair of magnetic poles (a pair of one N pole and one S pole adjacent thereto) is, the more preferable. This is because the smaller the installation range "r" becomes, the more detectable the wheel speed becomes in response to a slight rotation of the wheel. Specifically, the installation range "r" may be set to, for example, 1/n of the circumference of the magnetic sensor rotor 50, and "n" in this case may be a number at least greater than 4, and may be a number greater than 8, or a number greater than 16. The greater "n" is, the earlier point in time the wheel speed can be detected. The Hall element 51 detects changes in the magnetic field caused by the rotation of the magnetic sensor rotor 50, and is arranged with a predetermined gap between the element and the surface of the magnetic sensor rotor 50. The signal processing circuit 52 is connected to the Hall element 51 and generates a wheel speed signal by performing predetermined signal processing on the detection signal of the Hall element 51. Here, note that the configuration shown in FIG. 4 is merely an example and the configuration of the wheel speed sensor 41 is not limited thereto.

Figure 5:
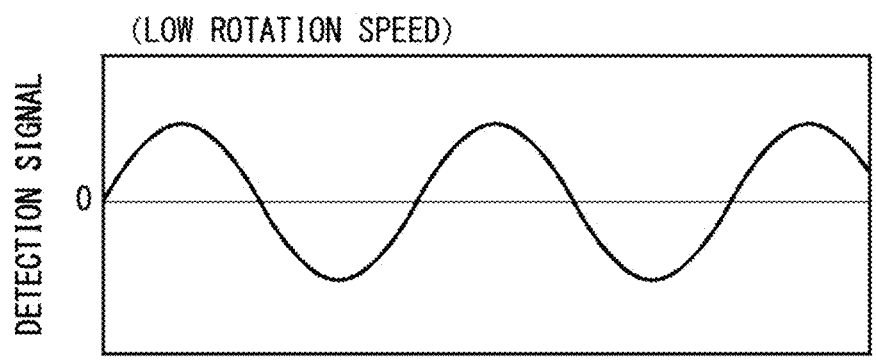
FIG. 5(A) and FIG. 5(B) are waveform diagrams showing an example of a detection signal output from a Hall element of a wheel speed sensor.
Figure 5:
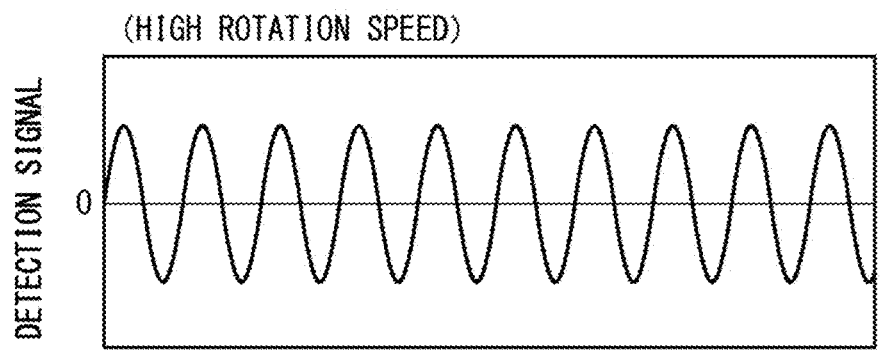

FIG. 5(A) and FIG. 5(B) are waveform diagrams showing an example of a detection signal output from a Hall element of a wheel speed sensor. In the wheel speed sensor 41 of the present embodiment, in response to continuous changes in the magnetic field as the magnetic sensor rotor 50 rotates, an alternating positive and negative sinusoidal detection signal is obtained from the Hall element 51. The waveform of a detection signal shown in FIG. 5(A) is the detection signal when rotation speed is relatively low, and the waveform of a detection signal shown in FIG. 5(B) is the detection signal when rotation speed is relatively high. The higher the rotation speed becomes, the higher the frequency of the detection signal becomes. In principle, this detection signal can be obtained even when the rotation speed of the magnetic sensor rotor 50 is extremely low. This is because a signal for one cycle is obtained each time the N pole and the S pole at positions facing the Hall element 51 are switched, and the N pole and the S pole can be arranged alternately within a relatively narrow range. In the wheel speed sensor 41 of the present embodiment, the signal detected by the Hall element 51 is appropriately amplified and shaped by the signal processing circuit 52, and then converted to a rectangular wave signal. In the present embodiment, this rectangular wave signal is used as the wheel speed signal. Specifically, when the wheel speed signal (the rectangular wave signal) is input to the controller 10, the controller 10 calculates the frequency of the rectangular wave based on the wheel speed signal, and obtains the wheel speed based on the magnitude of this frequency. Here, note that the signal processing method shown here is merely an example, and is not limited thereto.

Figure 6:
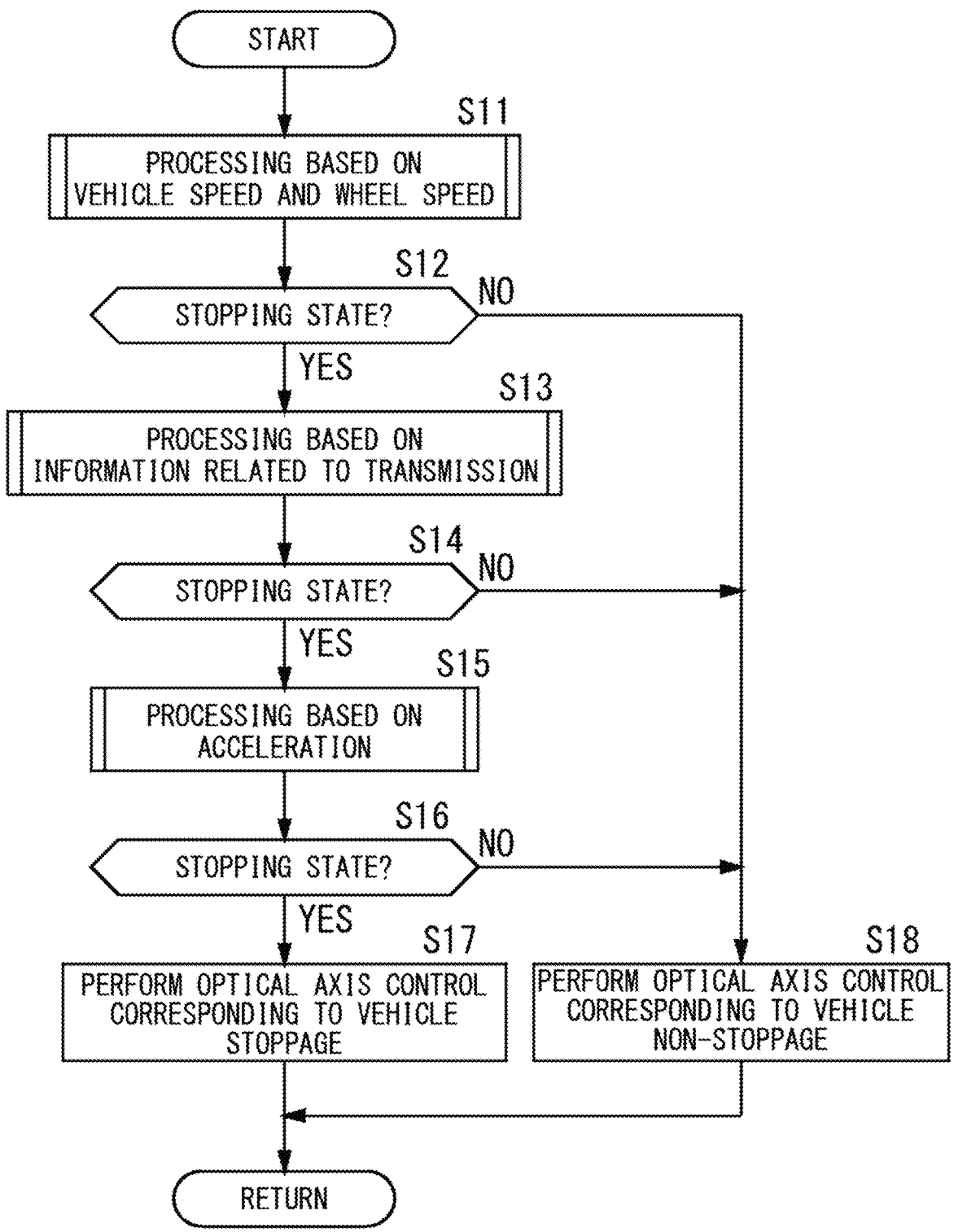
FIG. 6 is a flowchart showing an operating procedure of a vehicle headlamp system.

FIG. 6 is a flowchart showing an operating procedure of a vehicle headlamp system. Here, note that the order of each step may be changed as appropriate, and other steps not shown may be added as long as there is no contradiction or discrepancy in the results of information processing. (This also applies to the flowcharts shown in FIG. 7 to FIG. 9.)

The vehicle state specification unit 12 performs processing based on vehicle speed and wheel speed as one of the processings for specifying the state of the vehicle (step S11). Details of the processing in step S11 will be described later (refer to FIG. 7). When the state of the vehicle obtained as a result of the processing in step S11 is a "stopping state"

(step S12; YES), the processing proceeds to the next step S13. It should be noted that the processing here corresponds to a "third processing".

The vehicle state specification unit 12 performs processing based on information related to the transmission of the vehicle as one of the processings for specifying the state of the vehicle (step S13). Details of the processing in step S13 will be described later (refer to FIG. 8). When the state of the vehicle obtained as a result of the processing in step S13 is a "stopping state" (step S14; YES), the processing proceeds to the next step S15. It should be noted that the processing here corresponds to a "second processing".

The vehicle state specification unit 12 performs processing based on acceleration obtained using the acceleration sensor 21 provided in the vehicle as one of the processings for specifying the state of the vehicle (Step S15). Details of the processing in step S15 will be described later (refer to FIG. 9). When the state of the vehicle obtained as a result of the processing in step S15 is a "stopping state" (step S16; YES), the vehicle state specification unit 12 specifies the state of the vehicle as a "stopping state". It should be noted that the processing in step S15 corresponds to a "first processing".

When the state of the vehicle is specified as a "stopping state", the angle calculation unit 22 of the controller 10 uses the acceleration value obtained by the acceleration sensor 21, and calculates the attitude angle of the vehicle using a calculation method which corresponds to the stopping state. Then, the optical axis adjustment unit 23 generates a control signal for adjusting the optical axis "a" of the headlight units 30L and 30R according to the attitude angle determined by the angle calculation unit 22, and outputs the signal to the headlight units 30L and 30R. Based on this control signal, by causing the leveling actuator 32 to operate, the optical axis "a" of the light from the light source 31 is adjusted. That is, optical axis control corresponding to the stoppage of the vehicle is performed (step S17).

On the other hand, when the state of the vehicle obtained in any one of steps S12, S14, or S16 is not a "stopping state" (steps S12, S14, or S16; NO), the vehicle state specification section unit 12 specifies the state of the vehicle as a "non-stopping state". The term "non-stopping state" as used herein may include both a case where the vehicle is in a traveling state and a case where the vehicle is not in a stable stopping state.

When the state of the vehicle is specified as the "non-stopping state", the angle calculation unit 22 of the controller 10 does not calculate the attitude angle of the vehicle. In this case, the optical axis adjustment unit 23 does not generates a control signal for adjusting the optical axis "a" of the headlight units 30L and 30R according to the attitude angle determined by the angle calculation unit 22, or continues to output the control signal according to the attitude angle determined in the previous calculation. Thereby, the optical axis "a" of the light from the light source 31 is maintained unchanged. That is, the unit performs optical axis control corresponding to the traveling state of the vehicle (step S18). Here, note that the angle calculation unit 22 may calculate the attitude angle of the vehicle using various known methods suitable when the state of the vehicle is a "non-stopping state". In this case, a control signal corresponding to the obtained attitude angle is output by the optical axis adjustment unit 23.

Figure 7:
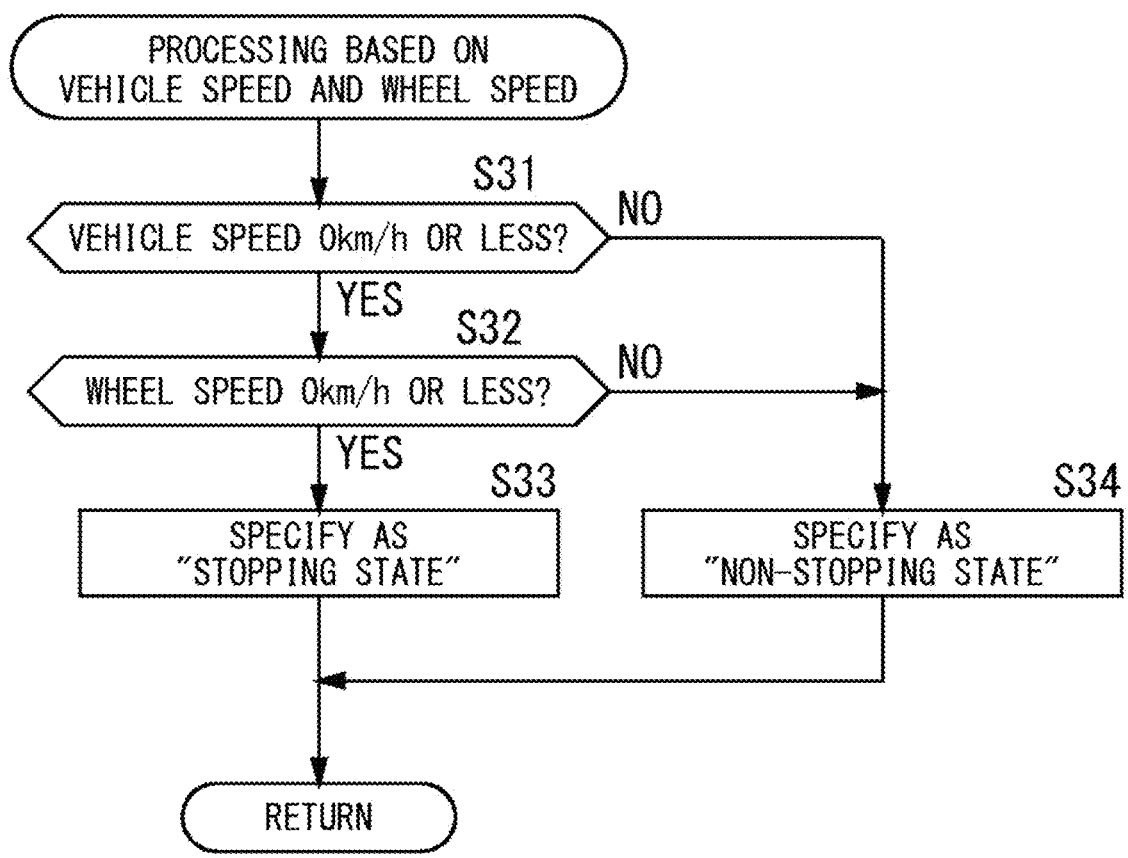
FIG. 7 is a flowchart showing a detailed operation procedure of step S11 shown in FIG. 6.

FIG. 7 is a flowchart showing a detailed operation procedure of step S11 shown in FIG. 6. Hereinafter, with reference to FIG. 7, processing based on vehicle speed and wheel speed as one of the processings for specifying the state of the vehicle will be described in detail.

The vehicle state specification unit 12 of the controller 10 determines whether or not the vehicle speed is 0 km/h or less based on a pulse signal (vehicle speed pulse) output from the vehicle speed sensor 40 (Step S31). As described above, in a case where the vehicle speed sensor 40 is caused to generate several pulses for each revolution of the vehicle axle, when the vehicle starts to move slightly for example, a considerable amount of time is required from the time the vehicle starts to move until a pulse signal is obtained. In such a case, or when the vehicle is actually at a stop, since no pulse signal is obtained at this step, it can be determined that the vehicle speed is not 0 km/h or more (a stopping state).

When the vehicle speed based on the vehicle speed pulse is 0 km/h or less (step S31; YES), the vehicle state specification unit 12 determines whether or not the wheel speed is 0 km/h or less based on the wheel speed signal from the wheel speed sensor 41 (step S32). As described above, when the wheel rotation is initiated, the wheel speed signal can be speedily obtained accordingly. Therefore, it is possible to respond even when the vehicle starts to move slightly, for example.

When the wheel speed based on the wheel speed signal is 0 km/h or less (step S32; YES), the vehicle state specification unit 12 specifies that the state of the vehicle is a "stopping state" (Step S33).

On the other hand, when the vehicle speed based on the vehicle speed pulse is greater than 0 km/h (step S31; NO), or when the wheel speed based on the wheel speed signal is greater than 0 km/h (step S32; NO), the vehicle state identification unit 12 specifies that the state of the vehicle is a "non-stopping state" (step S34).

As described above, when the processing based on the vehicle speed and the wheel speed is completed and the state of the vehicle is specified as either a "stopping state" or a "non-stopping state", the processing proceeds to the above-described step S12 (refer to FIG. 6). Here, in this processing, of the processing based on the vehicle speed and the processing based on the wheel speed, only one may be performed.

Figure 8:
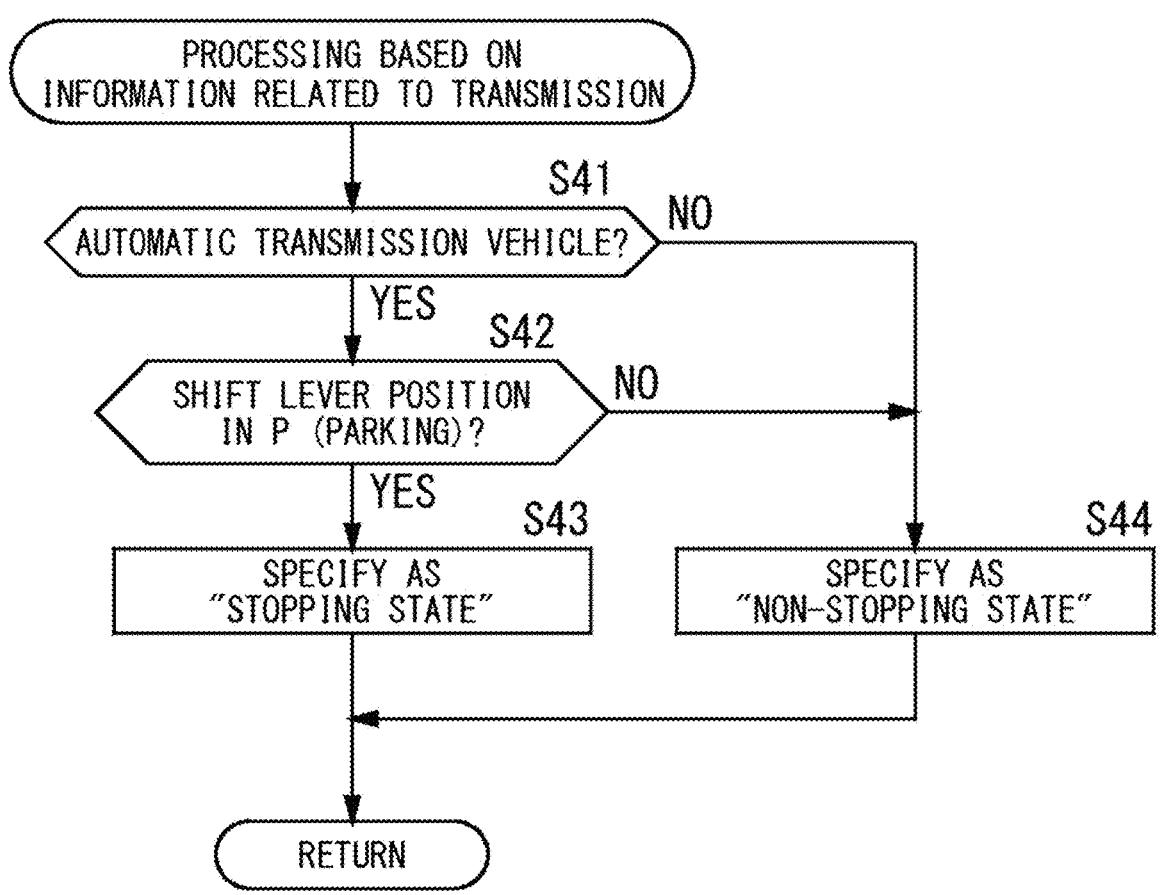
FIG. 8 is a flowchart showing a detailed operation procedure of step S13 shown in FIG. 6.

FIG. 8 is a flowchart showing a detailed operation procedure of step S13 shown in FIG. 6. Hereinafter, with reference to FIG. 8, a processing based on information related to the transmission as one of the processings for specifying the state of the vehicle will be described in detail.

The vehicle state specification unit 12 uses in-vehicle information acquired from other in-vehicle devices via an in-vehicle network by the in-vehicle information acquisition unit 11 to determine whether or not the vehicle is an automatic transmission vehicle (step S41). Here, the term "automatic transmission vehicle" as used in this specification refers to a vehicle in which gear change is automatically performed from when the vehicle starts to move until it reaches a normal traveling state. And whether or not the own vehicle is an automatic transmission vehicle can be specified based on vehicle type information which is an example of in-vehicle information. In such a case, it is assumed that the vehicle type information includes information such as vehicle name, grade, model year, model type or the like, which is capable of specifying whether or not the transmission installed in the vehicle is an automatic type.

When the own vehicle is an automatic transmission vehicle (step S41; YES), the vehicle state specification unit 12 uses in-vehicle information acquired from the in-vehicle network by the in-vehicle information acquisition unit 11 to determine whether or not the shift lever position of the own vehicle is in "P (Parking)" (step S42). Here, the position of the shift lever can be specified based on shift position information which indicates the position of the shift lever of the vehicle. It is assumed that the shift position information can be acquired via the in-vehicle network in accordance with the position of the shift lever.

When the shift lever position is in "P" (step S42; YES), the vehicle state specification unit 12 specifies the state of the vehicle to be a "stopping state" (Step S43).

On the other hand, when the own vehicle is a manual transmission vehicle or the like and not an automatic transmission vehicle (step S41; NO), or when the shift lever of the own vehicle is in a position other than "P" (step S42; NO), the vehicle state specification unit 12 specifies the state of the vehicle to be a "non-stopping state" (step S44).

As described above, when the processing based on the information related to the transmission is completed and the state of the vehicle is specified as either a "stopping state" or a "non-stopping state", the processing then proceeds to the above-described step S14 (refer to FIG. 6).

FIG. 9 is a flowchart showing a detailed operation procedure of step S15 shown in FIG. 6. Hereinafter, with reference to FIG. 9, a processing based on acceleration obtained using the acceleration sensor 21 provided in the vehicle as one of the processings for specifying the state of the vehicle will be described in detail.

The vehicle state specification unit 12 uses in-vehicle information acquired from other in-vehicle devices via an in-vehicle network by the in-vehicle information acquisition unit 11 to determine whether or not the vehicle is an engine vehicle (step S51). Here, the term "engine vehicle" as used in this specification refers to a vehicle that uses only an engine (internal combustion engine) as a main power source, such as a vehicle equipped with a gasoline engine or a diesel engine. And whether or not the own vehicle is an engine vehicle can be specified based on vehicle type information which is an example of in-vehicle information. In such a case, it is assumed that the vehicle type information includes information such as vehicle name, grade, model year, model type or the like, which is capable of specifying whether or not the vehicle is an engine vehicle.

When the own vehicle is an engine vehicle (step S51; YES), the vehicle state specification unit 12 uses in-vehicle information acquired from other in-vehicle devices via the in-vehicle network by the in-vehicle information acquisition unit 11 to determine whether or not the own vehicle is in a state other than so-called an idle stop state (step S52). Here, the term "idle stop state" as used in this specification refers to, in an engine vehicle that is equipped with a function that automatically stops the engine when the vehicle is temporarily at a stop, a state in which this function is activated. It is assumed that whether or not the vehicle is in the idle stop state can be determined based on vehicle status information acquired via the in-vehicle network.

When the own vehicle is in a state other than the idle stop state (step S52; YES), the vehicle state specification unit 12 sets a reference value used in the determination process of step S55 (to be described later) to a first value (step S53). On the other hand, when the own vehicle is a vehicle other than an engine vehicle such as a so-called hybrid vehicle or an electric vehicle (step S51; NO), or when the own vehicle is in an idle stop state (step S52; NO), the vehicle state specification unit 12 sets the reference value used in the determination process of step S55 (to be described later) to a second value (step S54).

Here, the above-stated "reference value" is used as a threshold value when determining whether or not the own vehicle is in a stopping state based on the acceleration. When the own vehicle is an engine vehicle and is in a state other than an idle stop state, since the vibration of the vehicle will be relatively large, as the first value, a value that is relatively greater than the second value is used. When the own vehicle is other than an engine vehicle or when the vehicle is in an idle stop state, since the vibration of the vehicle becomes relatively small, as the second value, a value relatively smaller than the first value is used.

The first value and the second value can be set as appropriate based on experiments, simulations or the like, and it is also preferable to set them to different values depending on the vehicle type. As an example, in the present embodiment, the first value is set to 5 mG in absolute value, and the second value is set to 2 mG in absolute value. Here, note that these numerical values are merely examples.

The vehicle state specification unit 12 determines whether or not the absolute value of the acceleration (as an example, the acceleration corresponding to the vertical direction of the vehicle) obtained using the acceleration sensor 21 is smaller than the reference value (the first value or the second value) (step S55). The acceleration corresponding to the vertical direction of the vehicle hardly changes when the own vehicle is traveling at a constant speed or when the vehicle is at a stop, but changes when the vehicle accelerates or decelerates. Therefore, by comparing the acceleration with the reference value, it is possible to determine whether or not the vehicle is at a stop.

When the absolute value of the acceleration is smaller than the reference value (step S55; YES), the vehicle state specification unit 12 specifies the state of the vehicle to be a "stopping state" (Step S56).

On the other hand, when the absolute value of the acceleration is greater than or equal to the reference value (step S55; NO), the vehicle state specification unit 12 determines the state of the vehicle to be a "non-stopping state" (step S57).

As described above, when the processing based on acceleration is completed and the state of the vehicle is specified as either a "stopping state" or a "non-stopping state", the processing proceeds to step S16 described above (refer to FIG. 6).

According to the embodiment described above, optical axis adjustment is performed according to the state of the vehicle. In detail, by performing processing based on vehicle speed and wheel speed, processing based on information related to the transmission, and processing based on acceleration, since the accuracy of specifying the state of the vehicle is improved, the accuracy of optical axis adjustment is improved.

Here, the present disclosure is not limited to the content of the embodiment described above, and can be implemented with various modifications within the scope of the gist of the present disclosure. For example, in the embodiment described above, three processings were performed, namely, processing based on vehicle speed and wheel speed, processing based on information related to the transmission, and processing based on acceleration. However, only one of the processings may be performed, or any two processings may be performed in combination.

Further, in the embodiment described above, a control is performed based on the wheel speed detected by the wheel speed sensor, but alternatively, the unit may specify the vehicle to be a "non-stopping state" when the rotation of a drive shaft or a propeller shaft is detected by each of the above-described sensors, and specify the vehicle to be a "stopping state" when no rotation is detected.

Further, in the above-described embodiment, a headlight unit whose optical axis (the direction of irradiation light) is mechanically adjusted using an actuator is exemplified as the headlight unit to be controlled. However, the configuration of the headlight unit is not limited thereto. For example, the optical axis may be adjusted by using a headlight unit that can freely control the light irradiation range using a plurality of light emitting elements, and by controlling on and off of each light emitting element. Further, the optical axis may be adjusted by using a lamp unit equipped with a light modulation device (such as a liquid crystal device) having a plurality of shutter elements that can transmit and shield (or attenuate) the light source and the light from the light source for each portion, and by controlling its light shielding range by the light modulation device. Furthermore, the optical axis may be adjusted by using a lamp unit having a laser element, a controller that controls on/off of laser beam emitted from the laser element, a scanning device that scans the direction of the laser beam and causes the laser beam to enter a fluorescent body, and the fluorescent body that generates fluorescence in response to the laser beam, and by controlling the scanning state of the laser beam.

REFERENCE SIGNS LIST

10: Controller
11: In-vehicle information acquisition unit
12: Vehicle state specification unit
21: Acceleration sensor
22: Angle calculation unit
23: Optical axis adjustment unit
30L, 30R: Headlight unit
31: Light source
32: Leveling actuator
40: Vehicle speed sensor
41: Wheel speed sensor
42: Drive shaft rotation detection sensor
43: Propeller shaft rotation detection sensor

The invention claimed is:

1. A vehicle headlight control apparatus which controls an optical axis of irradiation light emitted by a headlight of a vehicle comprising:
an acceleration sensor installed in the vehicle;
a specification unit which specifies whether a state of the vehicle is a stopping state or a non-stopping state;
an optical axis adjustment unit that adjusts the optical axis of the irradiation light in response to a specified result from the specification unit, by a control corresponding to each of the cases where the state of the vehicle is the stopping state and the non-stopping state;
wherein, as a first processing, the specification unit: sets a reference value which pertains to an acceleration to a first value when the vehicle is an engine vehicle; and sets the reference value to a second value which is smaller than the first value when the vehicle is other than the engine vehicle;
then performs processing, to specify that the state of the vehicle is the stopping state when the absolute value of an acceleration detected using the acceleration sensor is smaller than the reference value, and to specify that the state of the vehicle is the non-stopping state when the absolute value of the acceleration is equal to or greater than the reference value.

2. The vehicle headlight control apparatus according to claim 1,
wherein, in the first processing, the specification unit: sets the reference value to the first value when the vehicle is an engine vehicle and the vehicle is not in an idle stop state; and sets the reference value to the second value when the vehicle is an engine vehicle and the vehicle is in the idle stop state.

3. The vehicle headlight control apparatus according to claim 1,
wherein the acceleration detected using the acceleration sensor is an acceleration corresponding to the vertical direction of the vehicle.

4. The vehicle headlight control apparatus according to claim 1,
wherein, as a second processing, the specification unit performs processing, to specify that the state of the vehicle is the stopping state without performing the first processing when the vehicle is an automatic transmission vehicle and a shift lever position of the vehicle is in a position corresponding to parking, and to specify that the state of the vehicle is the non-stopping state when the vehicle is not an automatic transmission vehicle and/or the shift lever position of the vehicle is not in a position corresponding to parking; and
wherein, in the second processing, the specification unit specifies the state of the vehicle by further performing the first processing when the state of the vehicle is specified to be the non-stopping state.

5. The vehicle headlight control apparatus according to claim 4,
wherein, as a third processing, the specification unit performs processing to specify whether the state of the vehicle is the stopping state or the non-stopping state based on a speed and/or a wheel speed of the vehicle, and
wherein, in the third processing, the specification unit specifies the state of the vehicle by further performing the second processing when the state of the vehicle is specified to be the non-stopping state.

6. A vehicle headlight control method which controls an optical axis of irradiation light emitted by a headlight of a vehicle comprising:
(a) to specify whether a state of the vehicle is a stopping state or a non-stopping state;
(b) to adjust the optical axis of the irradiation light in response to a specified result from said (a), by a control corresponding to each of the cases where the vehicle is the stopping state and the non-stopping state,
wherein, as a first processing, said (a): sets a reference value which pertains to an acceleration to a first value when the vehicle is an engine vehicle; and sets the reference value to a second value that is smaller than the first value when the vehicle is other than the engine vehicle;
then performs processing, to specify that the state of the vehicle is the stopping state when the absolute value of an acceleration detected using an acceleration sensor is smaller than the reference value, and to specify that the state of the vehicle is the non-stopping state when the absolute value of the acceleration is equal to or greater than the reference value.

7. A vehicle headlight system that comprises the control apparatus according to claim 1 and a headlight whose optical axis is controlled by the control apparatus.

* * * * *